(12) United States Patent
Guvenkaya et al.

(10) Patent No.: US 9,065,710 B1
(45) Date of Patent: Jun. 23, 2015

(54) INTERFERENCE IDENTIFICATION FOR ORTHOGONAL FREQUENCY DIVISION MULTIPLEXING (OFDM) BASED SYSTEMS

(71) Applicants: Ertugrul Guvenkaya, Tampa, FL (US); Alphan Sahin, Tampa, FL (US); Huseyin Arslan, Tampa, FL (US)

(72) Inventors: Ertugrul Guvenkaya, Tampa, FL (US); Alphan Sahin, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/069,652

(22) Filed: Nov. 1, 2013

Related U.S. Application Data

(60) Provisional application No. 61/721,179, filed on Nov. 1, 2012.

(51) Int. Cl.
*H04L 27/26* (2006.01)
*H04B 1/10* (2006.01)

(52) U.S. Cl.
CPC .......... *H04L 27/2601* (2013.01); *H04B 1/1027* (2013.01)

(58) Field of Classification Search
CPC . H04L 5/0007; H04L 27/265; H04L 27/2628; H04L 27/2634; H04L 27/2601; H04B 1/7097; H04B 1/1027
USPC .......... 375/260, 340, 346; 370/210, 344, 480; 455/296, 501; 327/551
See application file for complete search history.

(56) References Cited

U.S. PATENT DOCUMENTS 7,672,407 B2 *  3/2010  Guo et al. ............... 375/346
7,751,488 B2 *  7/2010  Moffatt .................. 375/260

\* cited by examiner

*Primary Examiner* — Leon Flores
(74) *Attorney, Agent, or Firm* — Thomas | Horstemeyer, LLP

(57) ABSTRACT

Disclosed are various embodiments that are directed towards distinguishing between various types of interference in an orthogonal frequency division multiplexing (OFDM) wireless communication system. According to some embodiments, the system receives a set of symbols encoded in a predetermined subcarrier activation pattern according to an OFDM protocol. The system may determine a plurality of time averaged interference values, each time averaged interference value corresponding to a respective subcarrier index expressed in the set of symbols. Then, the system may separate frequency-based interference from time-based interference according to the plurality of time averaged interference values.

18 Claims, 8 Drawing Sheets

INTERFERENCE IDENTIFICATION FOR ORTHOGONAL FREQUENCY DIVISION MULTIPLEXING (OFDM) BASED SYSTEMS

CROSS-REFERENCE TO RELATED APPLICATIONS

This application claims priority to, and the benefit of, U.S. Provisional Patent Application titled "Interference Identification with Interference Spectrogram and Frequency Domain Eye Diagram for Orthogonal Frequency Division Multiplexing (OFDM) Based Systems," having Ser. No. 61/721,179, filed on Nov. 1, 2012, which is incorporated by reference in its entirety.

BACKGROUND

Many wireless communication systems have adopted orthogonal frequency-division multiplexing (OFDM) because of its ability to effectively convert frequency selective channel to multiple flat subchannels by one tap frequency domain channel equalization, adaptive and flexible bandwidth utilization and higher spectral efficiency with overlapping subcarriers.

Although robustness against frequency selectivity gave it advantage in multipath channels, OFDM systems may be subjected to frequency and/or time dispersive channel conditions. Rectangular pulse shape adopted by OFDM corresponds to sinc-shaped subcarriers, which have high sidelobes along frequency with zero crossing property at each subcarrier spacing. Overlapping sinc-shaped subcarriers make OFDM very sensitive to inter-carrier interference (ICI) in the presence of frequency domain impairments like Doppler spread and carrier frequency offset (CFO). Thus, ICI is an example of a frequency-based interference that is caused by frequency dispersion.

OFDM systems may also experience time-based interference. An example of time-based interference is inter-symbol interference (ISI). Inserting a guard interval, cyclic prefix (CP) that is copied from the end of a symbol with a length of greater than the maximum excess delay of the multipath channel, to the beginning of each symbol provides circular convolution of signal with channel, which makes frequency domain equalization without ISI possible. Any CP period shorter than the multipath channel length leads to both ISI from previous symbol and ICI due to loss of orthogonality between subcarriers.

Interference awareness and identification are problems in orthogonal frequency-division multiplexing based systems, with increased number of users along with excessive capacity demand.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

DETAILED DESCRIPTION

The present disclosure relates to interference visualization and identification methods for OFDM based communication systems. Multiple interferences such as inter-symbol and inter-carrier are visually differentiated with an interference spectrogram, by designing a special set of OFDM symbols. Instead of total interference, individual interferences are extracted from received signal. The interference visualization and identification according to various embodiments of the present disclosure provide a understanding and awareness of interference that can be used for testing, measurement and educational purposes and can be used to optimize the system and network performance.

Interference realized at a receiving device of an OFDM-based communication device may be caused by varying degrees of time dispersion and varying degrees of frequency dispersion. The present disclosure is directed to separating the different types of interference for diagnostic applications. In addition, devices may take remedial action in response to determining the types of interference, whether the interference is frequency-based or time-based.

Figure 1:
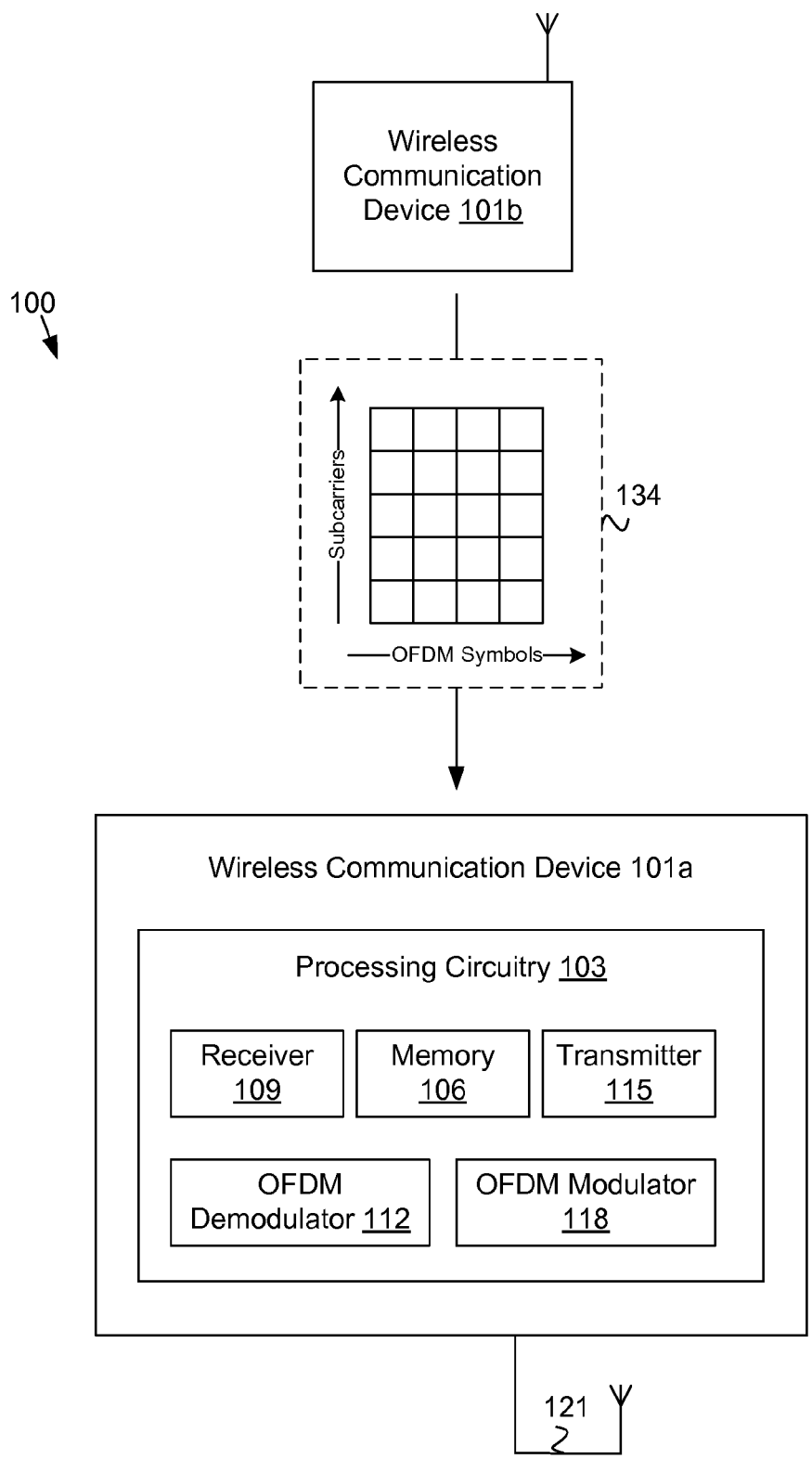
FIG. 1 is a drawing of a wireless communication system according to various embodiments of the present disclosure.

With reference to FIG. 1, shown is a wireless communication system 100 according to various embodiments. The wireless communication system 100 may include a plurality of communication devices 101 that wirelessly communicate with one another. A communication device 101 that is receiving data may be referred to as a receiving device 101a and a communication device 101 that is transmitting data may be referred to as a transmitting device 101b.

A communication device 101 may be a mobile device such as, for example, a laptop computer, notepad, notebook, ultrabook, tablet, cellular device, or any other device configured to transmit and/or receive wireless signals over a network. The communication device may also be, for example, a base station, wireless access point, or any other network node that establishes a wireless infrastructure.

A communication device 101 may comprise processing circuitry 103 that is configured to send data, receive data, and/or process data. The processing circuitry 103 may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry 103 may include one or more software modules executable within one or more processing circuits. The processing circuitry 103 may further include memory 106 configured to store instructions and/or code that causes the processing circuitry 103 to execute data communication functions.

The processing circuitry 103 may also comprise, a receiver 109, an OFDM demodulator, a transmitter 115, an OFDM modulator 118, or any other component that facilitates data communication. The communication device 101 may further comprise one or more antennas 121 configured to receive inbound wireless signals transmitted from a transmitting device 101b or send outbound signals to a receiving device 101a.

When receiving a wireless signal, the receiver 109 may filter, demodulate, amplify, and/or downconvert signals to process the data expressed in the wireless signal. If the wireless signal is formatted according to an OFDM protocol, an OFDM demodulator 112 may be used to convert the received wireless signal into the digital domain. When transmitting a wireless signal, the transmitter 115 may filter, modulate, amplify, and/or upconvert signals to encode data as a wireless signal. If the wireless signal is formatted according to an OFDM protocol, an OFDM demodulator 112 may be used to convert the digital data into an OFDM signal.

The non-limiting example of FIG. 1 further depicts a transmitting device 101b that sends an OFDM signal 134 to a receiving device 101a. The OFDM signal may include one or more OFDM frames. According to the OFDM protocol, data is encoded using various subcarriers and various symbols. An individual subcarrier is depicted as a single row and an individual symbol is depicted as a single column. Although the OFDM signal 134 depicts five subcarriers and five symbols, the present disclosure is not limited to any particular number of subcarriers and symbols. According to the OFDM protocol, data is encoded by activating various symbols using various subcarriers.

The OFDM signal 134 travels from a transmitting device 101b to a receiving device 101a over wireless multipath, time-varying channels. Channel conditions may cause the OFDM signal 134 to experience frequency dispersion, and/or time dispersion, at varying degrees. This results in an overall interference realized at the receiving device 101a.

Figure 2:
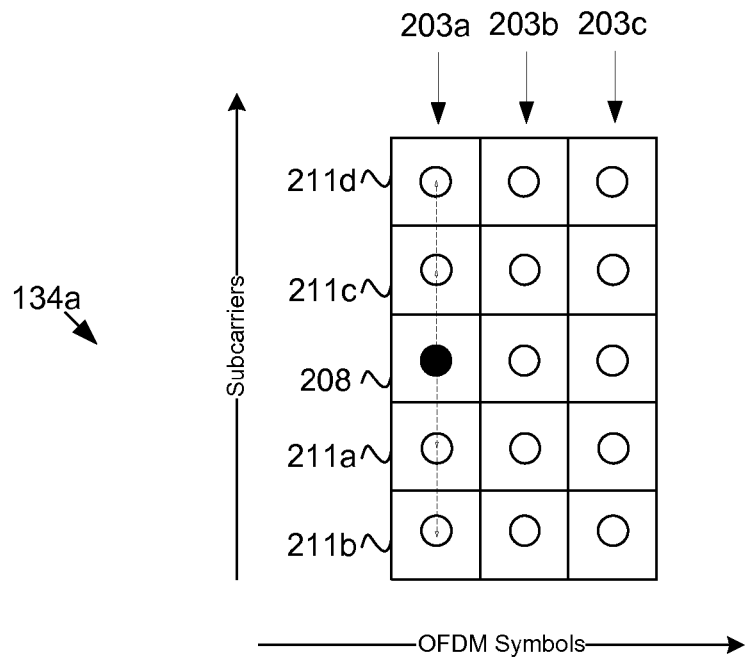
FIG. 2 is a drawing of an example of a set of symbols experiencing frequency-based interference in the wireless communication system of FIG. 1 according to various embodiments of the present disclosure.

Referring next to FIG. 2 shown is an example of a set of symbols experiencing frequency-based interference in the wireless communication system 100 of FIG. 1 according to various embodiments of the present disclosure. Frequency-based interference may be attributed to ICI or any other channel condition that causes frequency dispersion.

Specifically, the non-limiting example of FIG. 2 depicts an OFDM signal 134a that has a first OFDM symbol 203a, a second OFDM symbol 203b, and a third OFDM symbol 203c. The first symbol 203a is activated such that one subcarrier 208 is used. The other subcarriers 211a-d are not used. This OFDM signal 134a is associated with a channel condition that causes frequency dispersion such that frequency-based interference is realized at a receiving device 101a (FIG. 1). The activated symbol (e.g., first symbol 203a), associated with the particular subcarrier 208, may be referred to as an interferer that interferes with other subcarriers 211a-d associated with the first symbol 203a. The arrows radiating from the interferer represents inter-carrier interference throughout the first symbol 203a. It may be the case that this inter-carrier interference does not affect neighboring symbols 203b,c. As a result, the OFDM signal 134a of FIG. 2 is subjected only to frequency-based interference as each subcarrier 208, 211 may correspond to a respective neighboring frequency.

Figure 3:
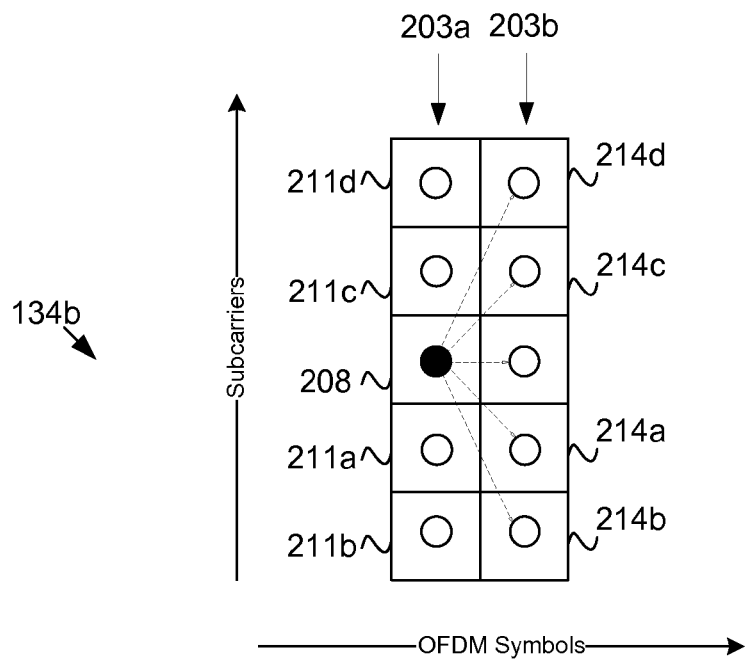
FIG. 3 is a drawing of an example of a set of symbols experiencing time-based interference in the wireless communication system of FIG. 1 according to various embodiments of the present disclosure.

FIG. 3 is a drawing of an example of a set of symbols experiencing time-based interference in the wireless communication system 100 of FIG. 1 according to various embodiments of the present disclosure. Time-based interference may be attributed to ISI or any other channel condition that causes time dispersion.

Specifically, the non-limiting example of FIG. 3 depicts an OFDM signal 134b that has a first OFDM symbol 203a and a second OFDM symbol 203b. The first symbol 203a is activated such that one subcarrier 208 is used. The other subcarriers 211a-d are not used. This OFDM signal 134b is associated with a channel condition that causes time dispersion such that time-based interference is realized at a receiving device 101a (FIG. 1). The activated symbol of the first symbol 203a on the particular subcarrier 208 may be referred to as an interferer that interferes with other symbols 203b. The arrows radiating from the interferer represents inter-symbol interference initiated by the first symbol 203a and affecting the second symbol 203b. It may be the case that this inter-symbol interference does not affect other subcarriers of the symbol 203a of the interferer. As a result, the OFDM signal 134a of FIG. 2 is subjected only to time-based interference as each symbol 203a-c may correspond to a respective time slot or transmission time.

The non-limiting examples of FIG. 2 and FIG. 3 depict frequency-based interference and time-based interference, respectively. The OFDM signal 134 received by a receiving device 101a may be subjected to either frequency-based interference, time-based interference, or a combination thereof. Moreover, varying degrees of frequency-based interference and varying degrees of time-based interference may affect the OFDM signal 134 that is received. The present disclosure is directed to distinguishing these interferences.

Figure 4:
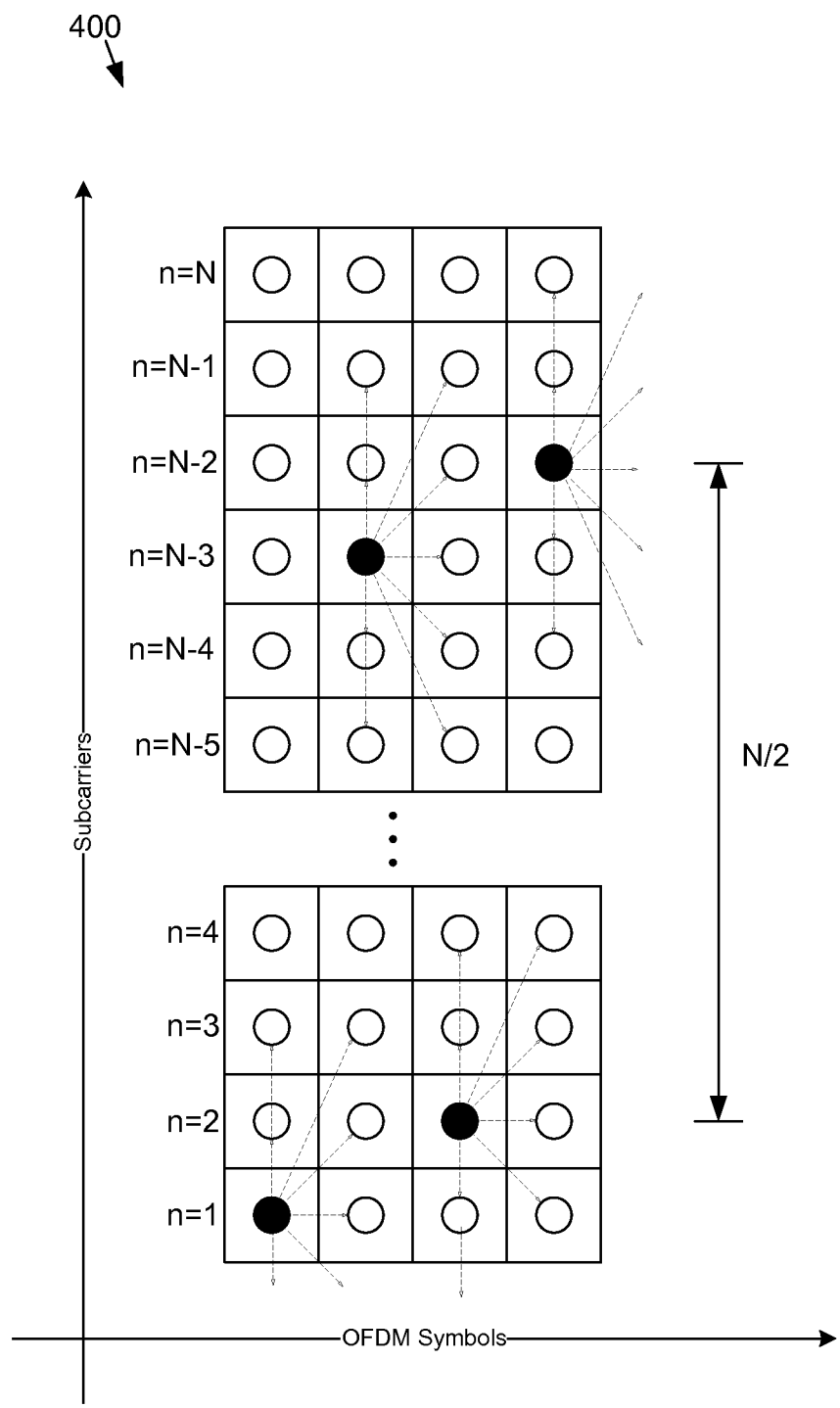
FIG. 4 is a drawing of an example of a set of symbols that may be implemented in an OFDM test frame in the wireless communication system of FIG. 1 according to various embodiments of the present disclosure.

With reference to FIG. 4, shown is an example of a set of symbols 400 that may be implemented in an OFDM test frame in the wireless communication system 100 of FIG. 1 according to various embodiments of the present disclosure. Specifically, the set of symbols 400 may be included in an OFDM test frame that is used in a wireless communication system 100 of FIG. 1 to detect a degree of frequency dispersion and detect a degree of time dispersion of the channel conditions.

A transmitting device 101b (FIG. 1) may send an OFDM test frame to a receiving device 101a (FIG. 1), where the OFDM test frame includes the set of symbols 400. The set of symbols may be encoded according to a predetermined subcarrier activation pattern according to an OFDM protocol. The predetermined subcarrier activation format may be optimized in manner that facilitates a detection of both frequency dispersion and time dispersion. That is to say, those symbols that are activated according to the predetermined subcarrier activation pattern allow a receiving device 101a to distinguish between frequency dispersion and time dispersion. For example, the interference powers associated with each of these desperations may be determined.

For example, the predetermined subcarrier activation pattern may specify that each pair of activated subcarriers of consecutive symbols, among the set of symbols 400, is separated according to a maximum circular separation. Assuming that the predetermined subcarrier activation pattern includes N number of subcarriers. Then, the difference between the subcarrier of a particular symbol and the subcarrier of an adjacent symbol is maximized to be a value of N/2 (assuming that the subcarriers are circular). By maximizing the distance between active subcarriers, the receiving device 101a may detect interference between pairs of adjacent symbols within the set of symbols 400.

When channel excess delay is longer than the CP size, the ith symbol in which k=(i+N/2)th subcarrier is activated gets leakage from (i−1)th symbol in which (i−1+N/2)th subcarrier is active. Therefore, ICI due to time selectivity and ISI due to insufficient CP are combined near the active symbol. To be able to distinguish the interference coming from a previous symbol (due to insufficient CP) from the self-interference coming from subcarriers of a current symbol (due to time selectivity), subcarrier distance between consecutive symbols is increased. This is achieved by using a predetermined subcarrier activation pattern that is optimized to facilitate a detection of both frequency dispersion and time dispersion.

Figure 5:
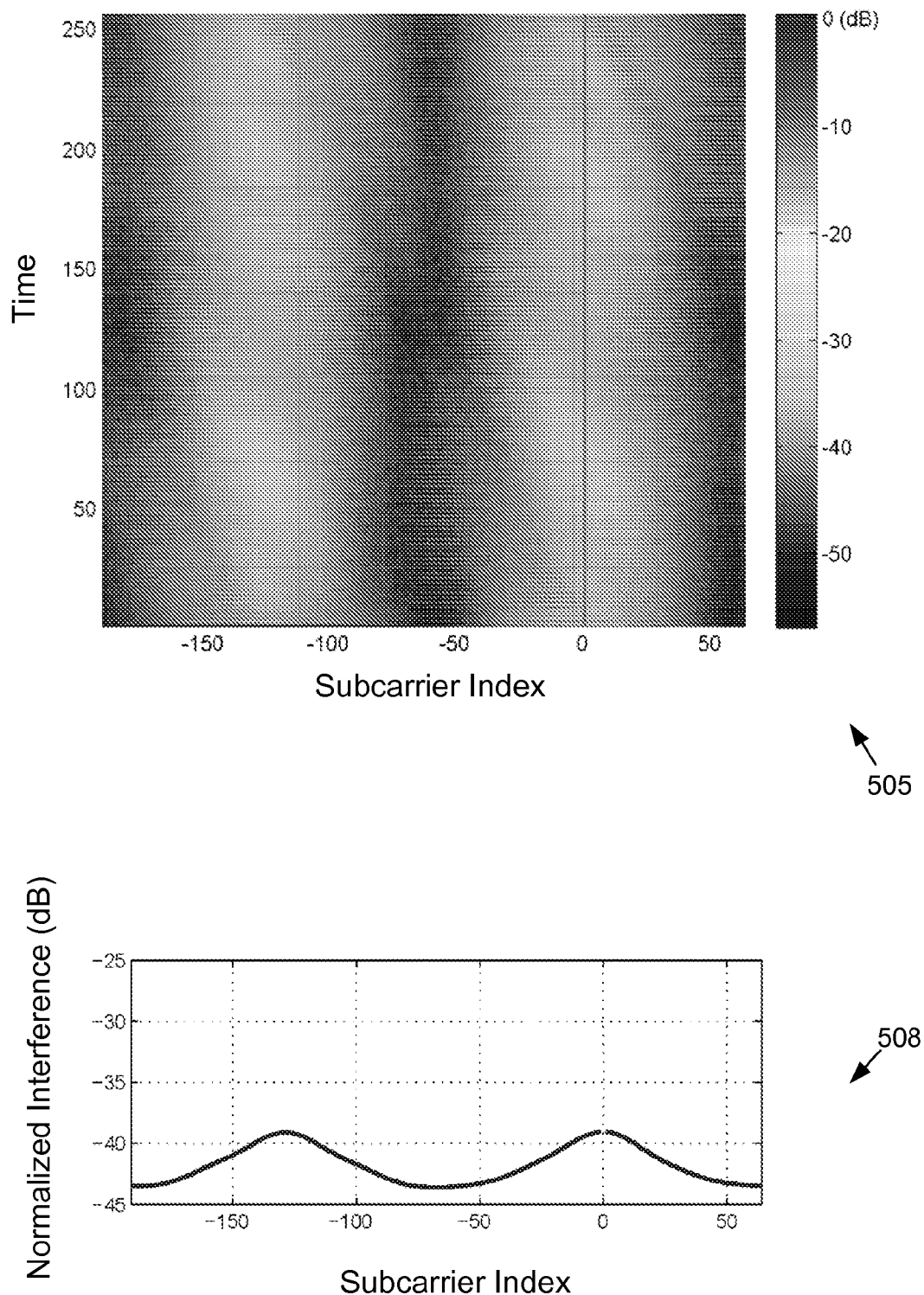
FIG. 5 is a drawing of graphical representations of time-based interference that may occur in the wireless communication system of FIG. 1 according to various embodiments of the present disclosure.

FIG. 5 is a drawing of graphical representations 505, 508 of time-based interference that may occur in the wireless communication system 100 of FIG. 1 according to various embodiments of the present disclosure. The first graphical representation 505 is an interference spectrogram that indicates a signature of time-based interference that is detected by a receiving device 101a (FIG. 1) that receives a set of symbols 400 (FIG. 4) of an OFDM test frame, where the set of symbols 400 experiences time dispersion.

To generate this first graphical representation 505, each symbol among the set of symbols 400 is subjected to a Discrete Fourier Transform (DFT) operation and then circularly shifted. This results in active subcarriers being aligned as a straight line along the time axis. Time-based interference may be caused when a CP duration is shorter than the channel excess delay. In this case, two components of this time-based interference are represented in the first graphical representation 505: Interference from subcarriers of previous symbols and ICI between subcarriers of current symbols due to loss of orthogonality emerge at the left and right part of interference plot, respectively. In this respect, a time-based interference is characterized by an equality between these two components.

The second graphical representation 508 is generated by performing a power calculation and then time averaging the powers to generate a normalized interference for each subcarrier in the set of symbols 400. To this end, the left and right components are extenuated to demonstrate the equality between the interference from subcarriers of previous symbols and ICI between subcarriers of current symbols.

Figure 6:
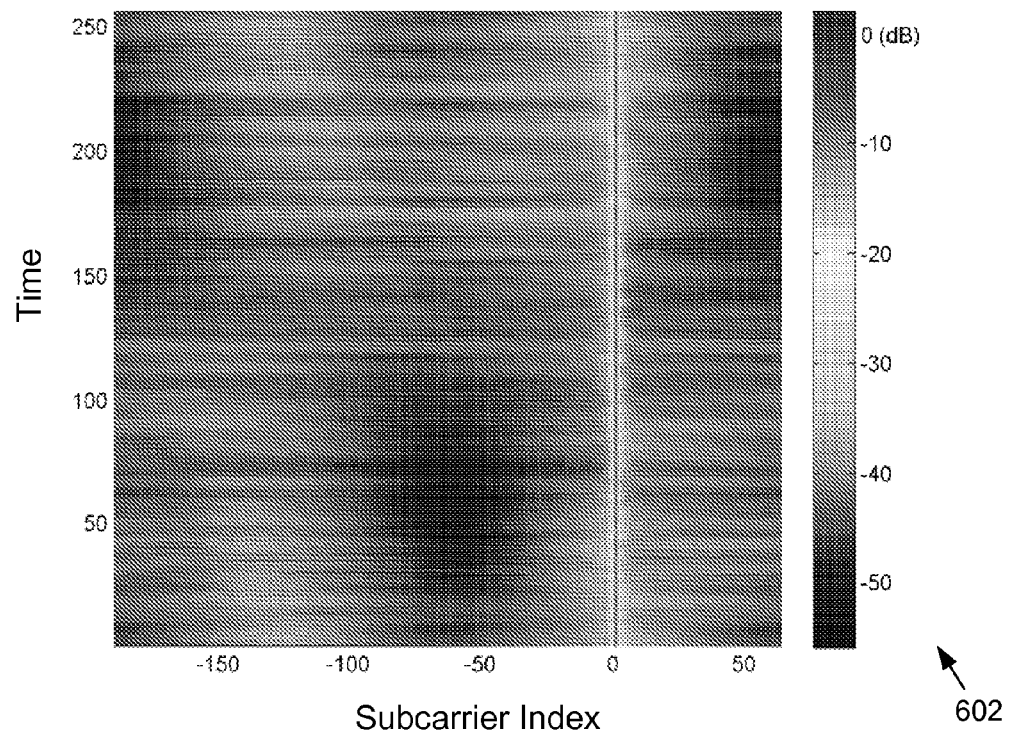
FIG. 6 is a drawing of graphical representations of time-based interference and frequency-based interference that may occur in the wireless communication system of FIG. 1 according to various embodiments of the present disclosure.
Figure 6:
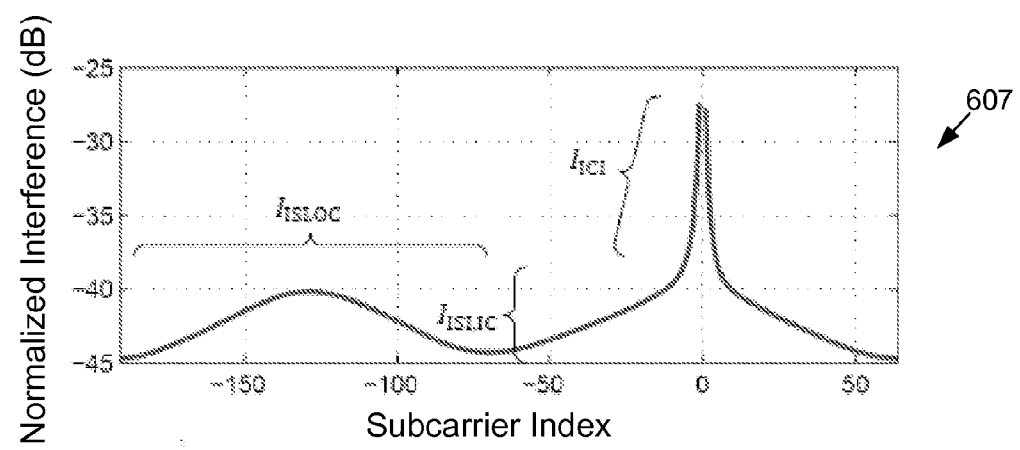

FIG. 6 is a drawing of graphical representations 602, 607 of time-based interference and frequency-based interference that may occur in the wireless communication system 100 of FIG. 1 according to various embodiments of the present disclosure. The first graphical representation 602 is an interference spectrogram that indicates a signature of a combination of time-based interference and frequency based interference that is detected by a receiving device 101a (FIG. 1) that receives a set of symbols 400 (FIG. 4) of an OFDM test frame, where the set of symbols 400 experiences both time dispersion and frequency dispersion.

To generate this first graphical representation 602, each symbol among the set of symbols 400 is subjected to a Discrete Fourier Transform (DFT) operation and then circularly shifted. This results in active subcarriers being aligned as a straight line along the time axis. Time-based interference may be caused when a CP duration is shorter than the channel excess delay. Frequency-based interference may be caused by channel conditions characterized by Doppler spread and/or frequency offset. Unlike the graphical representation 505 of FIG. 6, two relatively equal components of interference are not represented due to the introduction of frequency-based interference.

The second graphical representation 607 is generated by performing a power calculation and then time averaging the powers to generate a normalized interference for each subcarrier in the set of symbols 400. By performing the power calculation and time averaging operations, a left component and a right component are seen in the second graphical representation 607, where the left component is not equal to the right component.

Interference coming from the same subcarrier of previous symbols, is referred to as $I_{ISI,SC}$. The second graphical representation 607 depicts the loss of orthogonality between subcarriers of a current symbol, referred to as $I_{ISI,IC}$. The second graphical representation 607 further depicts interference coming from other subcarriers of previous symbols, referred to as $I_{ISI,OC}$. The total interference from one subcarrier to others is the same as the total interference coming to one subcarrier from other subcarriers.

$I_{ISI,SC}$ and $I_{ISI,OC}$ emerge as a hill around the N/2 subcarrier distance with an active subcarrier index and $I_{ISI,IC}$ appears near the active subcarrier. In the presence of both time selectivity and insufficient CP size, ICI power due to time selectivity, dominating near active subcarriers combine with $I_{ISI,IC}$ in the first graphical representation 602.

Figure 7:
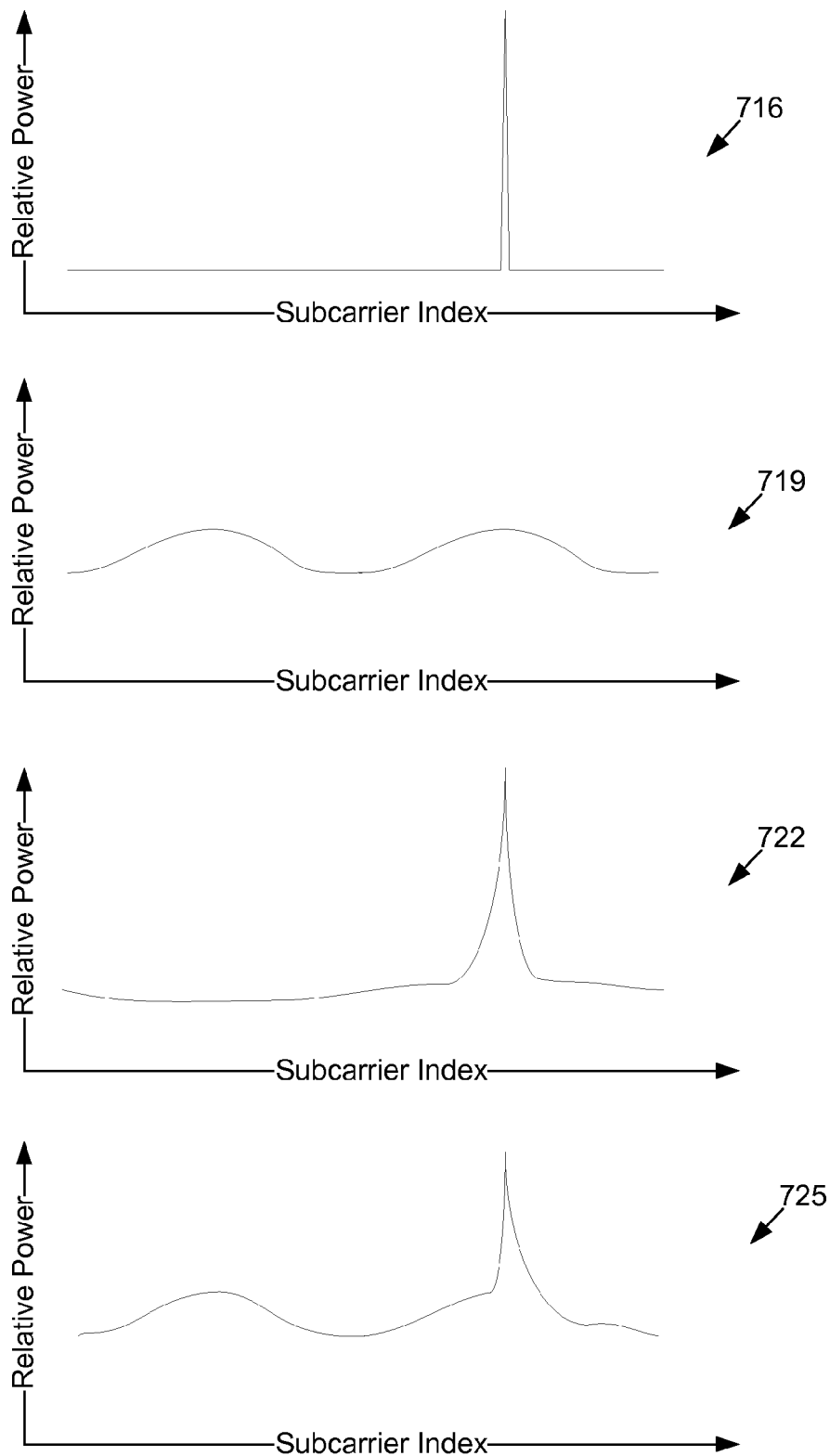
FIG. 7 is a drawing of various graphical representations that compare relative power to subcarrier indices of symbols received in the wireless communication system of FIG. 1 according to various embodiments of the present disclosure.

Referring next to FIG. 7, shown are various graphical representations 716, 719, 722, 725 that compare relative power to subcarrier indices of symbols received in the wireless communication system of FIG. 1 according to various embodiments of the present disclosure. For each graphical representation 716, 719, 722, 725, the subcarrier index is represented along the x-axis, where the subcarrier index correlates to a respective subcarrier expressed in the set of symbols 400 (FIG. 4). Moreover, for each graphical representation 716, 719, 722, 725, the relative power is represented along the y-axis, where the relative power is determined by performing a DFT operation on the received set of symbols, cyclically shifting the set of symbols 400, performing a power calculation on the shifted symbols, and time-averaging the power to generate a relative power for each subcarrier index.

The first graphical representation 716 depicts a received symbol with no time dispersion or frequency dispersion. In this respect, the first graphical representation 716 is an additive white Gaussian noise (AWGN) signal with no substantial impairment. The second graphical representation 719 depicts an example of time-based interference only. This is similar to the second graphical representation 508 of FIG. 5. The left component and the right component are relatively equal, indicating a signature of time-dispersion in the received symbol. The third graphical representation 722 depicts an example of frequency-based interference only. As shown in the third graphical representation 722, leakage from a subcarrier causes neighboring subcarriers to appear to be activated.

The fourth graphical representation 725 depicts an example of a combination of time-based interference and frequency-based interference. That is to say, the fourth graphical representation demonstrates a total interference realized at the receiving device 101a (FIG. 1). Time dispersion and frequency dispersion may be differentiated by subtracting the total power on N/2 subcarriers that are farthest from the active subcarrier from total power on N/2 subcarrier that are closest to the active subcarrier. In other words, because the two components of the time-based interference are similar, the left component may be subtracted from the right component to determine the degree of frequency-based interference. And, the degree of time-based interference is determined based on the total inference and the frequency interference. Thus, subtracting the left component (ISI from previous symbol) from right part (ICI due to Doppler/CFO and ICI due to loss of orthogonality) will give ICI due to CFO/Doppler.

Figure 8:
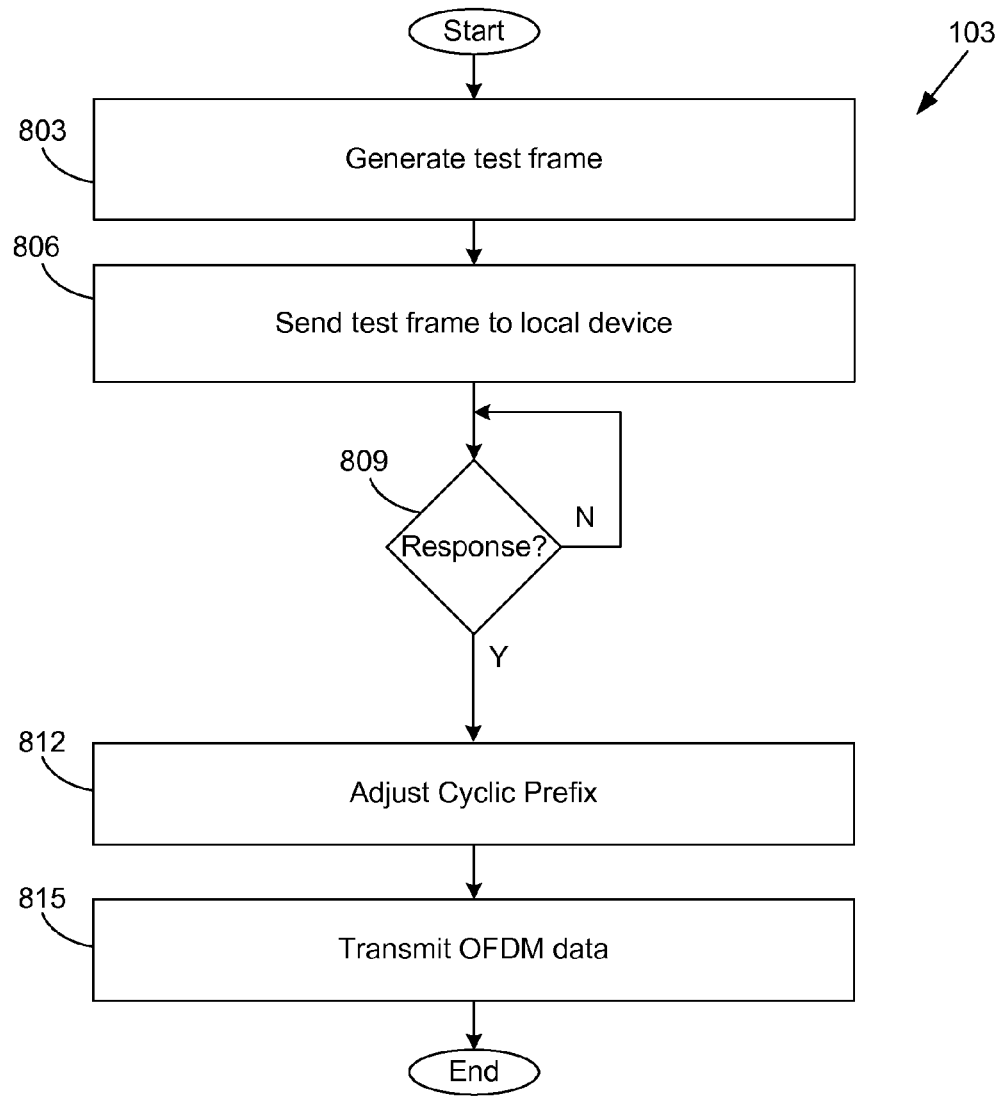
FIG. 8 is a flowchart illustrating one example of functionality implemented as portions of processing circuitry of a transmitting device in the wireless communication system of FIG. 1 according to various embodiments of the present disclosure.

Turning now to FIG. 8, shown is a flowchart illustrating one example of functionality implemented as portions of the processing circuitry 103 of a transmitting device 101b (FIG. 1) in the wireless communication system 100 of FIG. 1 according to various embodiments of the present disclosure. It is understood that the flowchart of FIG. 8 provides merely an example of the many different types of functional arrangements that may be employed to implement the operation of the portion of the logic executed by the processing circuitry 103 as described herein. As an alternative, the flowchart of FIG. 8 may be viewed as depicting an example of steps of a method implemented in the processing circuitry 103 according to one or more embodiments.

Beginning at 803, the processing circuitry generates a test frame. The test frame includes a set of symbols 400 (FIG. 4) activated according to a predetermined subcarrier activation pattern. The predetermined subcarrier activation pattern may specify that each pair of activated subcarriers of consecutive symbols, among the set of symbols 400, is separated according to a maximum circular separation. For example, the predetermined subcarrier activation pattern may be configured to maximize the distance between active subcarriers to facilitate a detection of interference between pairs of adjacent symbols among the set of symbols.

At 806, the processing circuitry 103 sends the test frame to a local device such as, for example, a receiving device 101b (FIG. 1). The processing circuitry 103 may use an OFDM modulator 118 to encode the set of symbols 400 to generate an OFDM signal 134 (FIG. 1). The processing circuitry 103 uses the transmitter 115 (FIG. 1) to transmit the test frame to the receiving device 101a. The test frame is used by the receiving device 101a to detect the degree of time dispersion and/or a degree of frequency dispersion that may result from the present channel conditions.

At 809, the processing circuitry 103 waits for a response from the receiving device 101a. The receiving device 101a may send instructions to the transmitting device 101b to make transmission adjustments according to any detected interference. If a response is received, then, at 812, the processing circuitry may make adjustments to the manner in which it transmits data to the receiving device 101a. For example, if the receiving device 101a detected that there is time-based interference that causes time dispersion in received symbols, then the receiving device 101a may send an instruction to adjust the cyclic prefix in subsequent transmissions.

Inserting of a guard interval, cyclic prefix (CP) copied from end of the symbol with a length of greater than the maximum excess delay of the multipath channel, to the beginning of each symbol provides circular convolution of signal with channel, which makes frequency domain equalization without intersymbol interference (ISI) possible. Any CP period shorter than the multipath channel length leads to both ISI from previous symbol and ICI due to loss of orthogonality between subcarriers. Accordingly, in the presence of time-based interference, the processing circuitry 103 may adjust the CP duration to reduce the likelihood of time-based interference in subsequent transmissions.

At 815, the processing circuitry transmits OFDM data using the adjusted cyclic prefix. This may reduce the time-based interference detected by the receiving device 101a for subsequent data transmissions.

Figure 9:
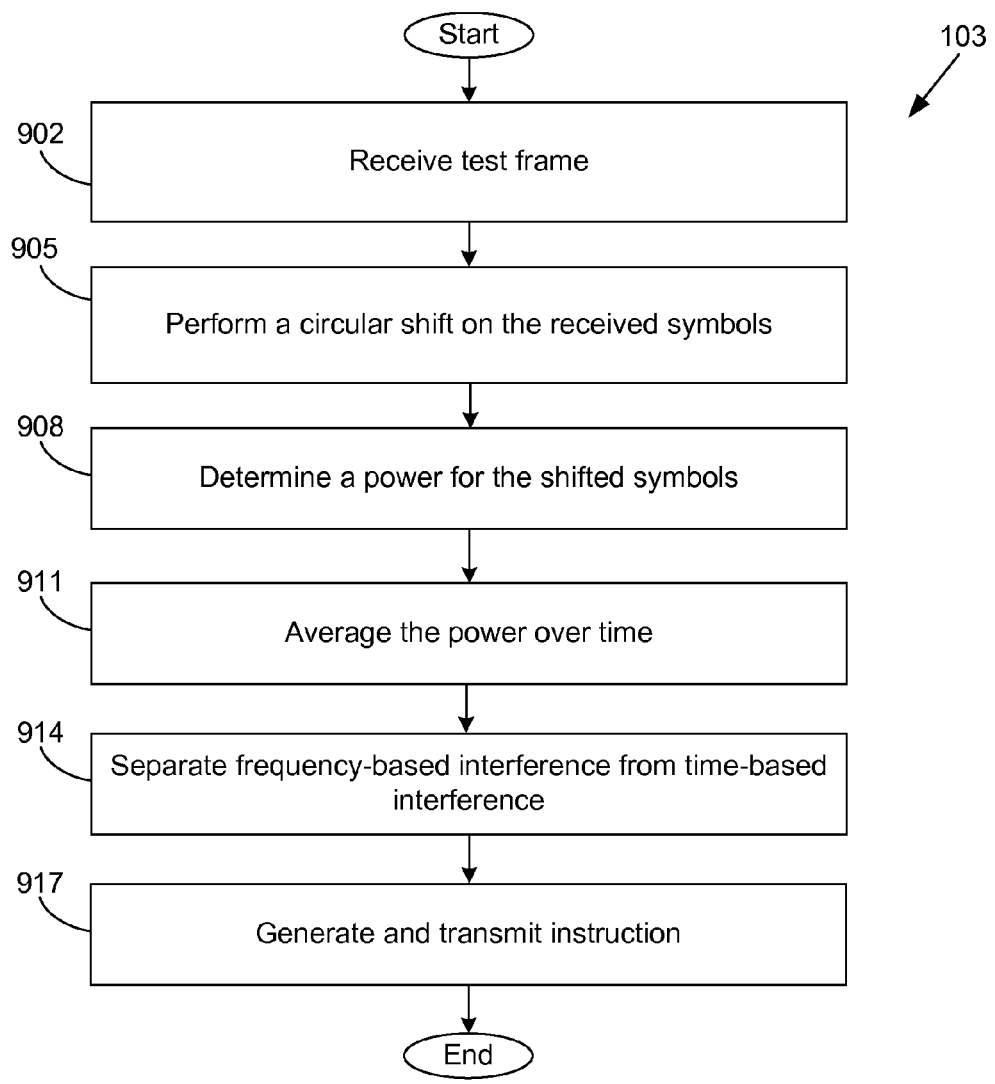
FIG. 9 is a flowchart illustrating one example of functionality implemented as portions of processing circuitry of a receiving device in the wireless communication system of FIG. 1 according to various embodiments of the present disclosure.

With reference to FIG. 9, shown is a flowchart illustrating one example of functionality implemented as portions of the processing circuitry 103 of a receiving device 101a (FIG. 1) in the wireless communication system 100 of FIG. 1 according to various embodiments of the present disclosure. It is understood that the flowchart of FIG. 9 provides merely an example of the many different types of functional arrangements that may be employed to implement the operation of the portion of the logic executed by the processing circuitry 103 as described herein. As an alternative, the flowchart of FIG. 9 may be viewed as depicting an example of steps of a method implemented in the processing circuitry 103 according to one or more embodiments.

At 902, the processing circuitry 103 receives a test frame. The test frame includes a set of symbols 400 (FIG. 4). The set of symbols 400 is activated according to a predetermined subcarrier activation pattern. The predetermined subcarrier activation pattern may specify that each pair of activated subcarriers of consecutive symbols, among the set of symbols 400, is separated according to a maximum circular separation. For example, the predetermined subcarrier activation pattern may be configured to maximize the distance between active subcarriers to facilitate a detection of interference between pairs of adjacent symbols among the set of symbols. The processing circuitry 103 may use a receiver 109 to receive the test frame and use an OFDM demodulator to extract the data encoded in the test frame.

At 905, the processing circuitry 103 performs a circular shift on the received set of symbols 400. For example, each received symbol is subjected to a DFT operation and then circularly shifted in frequency domain so that activated subcarriers are aligned over a time axis. The shift values for 1st to Nth symbol are adjusted according to hopping subcarrier order such as, for example, [0, $-N/2$, $-1$, $-N/2-1$, $-2$, $-N/2-2$, $-3$ . . . , $-N+2$, $-N/2+1$, $-N+1$].

At 908, the processing circuitry 103 determines a power for each of the shifted symbols. The processing circuitry 103 may perform a power calculation such by taking the absolute-square of the each entry in the received vectors. According to various embodiments, the processing circuitry 103 may render for display a graphical representation that depicts a power level for the various subcarrier indices versus time. For example, the graphical representation may be similar to the first graphical representation 505 of FIG. 5 or the first graphical representation 602 of FIG. 6.

At 911, the processing circuitry 103 averages the power over time. By averaging the power over time, a normalized interference power may be determined for each subcarrier index. According to various embodiments, the processing circuitry 103 may render for display a graphical representation that depicts a normalized interference for the various subcarrier. For example, the graphical representation may be similar to the second graphical representation 508 of FIG. 5 or the second graphical representation 607 of FIG. 6.

At 914, the processing circuitry 103 separates frequency-based interference from time-based interference. In this respect the processing circuitry 103 determines a degree of frequency dispersion expressed in the set of symbols 400 and determines a degree of time dispersion expressed in the set of symbols 400. Inter-symbol interference due to insufficient guard (CP) duration (denoted as $I_{TD}$, TD: time dispersion) and inter-carrier interference due to time selective (frequency dispersive) channel (denoted as $I_{FD}$, FD: frequency dispersive) are separated from each other. By subtracting sum of N/2 circularly farthest samples from the sum of N/2−1 circularly closest samples to activated subcarrier index and corresponding powers are estimated as $$I_{TD} = \sum_{k=-\frac{N}{4}(mod\ N)}^{N/4} P(k) - \sum_{k=\frac{N}{4}+1}^{\frac{3N}{4}} P(k)$$

where P(k) is the power of the kth subcarrier of the time averaged vector. Thus the difference between a first portion of the plurality of time averaged interference values and a second portion of the plurality of time averaged interference values is used to determine the degree of frequency dispersion and the degree of time dispersion.

In response to determining a degree of frequency dispersion and/or a degree of time dispersion, the processing circuitry 103, at 917, generates and transmits an instruction to adjust subsequent OFDM data. For example, based on the degree of time dispersion, the processing circuitry 103 may determine that the CP duration for subsequent OFDM data transmission should be adjusted. The processing circuitry of the receiving device 101a may communication with a transmitting device 101b to instruct the transmitting device to adjust the CP duration.

In various embodiments, the processing circuitry 103 may be used to generate graphical representations that distinguish and express the various types of interferences. These graphical representations may be used for diagnostic applications to calibrate or design communication devices 101. Moreover, the processing circuitry 103 may be configured to communicate with a display to render the graphical representations to a user. The display may be a liquid crystal display, a cathode ray tube display, or any other display.

The processing circuitry 103 may generate eye diagrams for signals in the time domain. Overlapping OFDM subcarriers in frequency is analogous to time overlapping of Nyquist pulse shapes in single carrier communications. For example, raised cosine filter is the most popular pulse shaping filter that satisfies the Nyquist criterion. However, zero-ISI property of Nyquist pulse shaped single carrier signals is distorted in multipath channels. Timing jitter at the receiver also causes ISI. Similar to effect of time domain impairments on zero-ISI property of Nyquist filtered single carrier signals, frequency domain impairments disturb the zero-ICI property of the OFDM subcarriers. By this analogy, the frequency domain eye diagram allows a user to visualize the level of distortions like Doppler Spread and CFO.

Sinc-shaped subcarriers of OFDM are visualized by eye diagram in frequency domain. Eye openings are constructed by denser interpolation between output samples of regular N point DFT which provides better visualization and understanding of frequency domain impairments like Doppler spread and frequency offset.

The processing circuitry 103 implemented in either the transmitting device 101b and/or the receiving device 101a, and other various systems described herein may be embodied in software or code executed by general purpose hardware. As an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8 and 9 show the functionality and operation of an implementation of portions of the processing circuitry 103 implemented in the wireless communication system 100. If embodied in software, each block, indicated by a reference number, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block, indicated by a reference number, may represent a circuit or a number of interconnected circuits to implement the specified logical function(s).

Although the flowcharts of FIGS. 8 and 9 show a specific order of execution, it is understood that the order of execution may differ from that which is depicted. For example, the order of execution of two or more blocks may be scrambled relative to the order shown. Also, two or more blocks shown in succession in FIGS. 8 and 9 may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the processing circuitry 103 that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method comprising:
receiving, by processing circuitry, a set of symbols encoded in a predetermined subcarrier activation pattern according to an orthogonal frequency division multiplexing protocol, the predetermined subcarrier activation pattern including a pair of activated subcarriers of consecutive symbols, among the set of symbols, that are separated according to a maximum circular separation to facilitate a detection of interference between the pair of activated subcarriers;
determining, by the processing circuitry, a degree of frequency dispersion expressed in the set of symbols; and
determining, by the processing circuitry, a degree of time dispersion expressed in the set of symbols.

2. The method of claim 1, generating a graphical representation of at least one of the degree of frequency dispersion or the degree of time dispersion.

3. The method of claim 2, wherein the graphical representation comprises an interference spectrogram that specifies a plurality of subcarrier indices, each subcarrier index corresponding to a respective normalized interference value.

4. The method of claim 1, further comprising performing a discrete Fourier transformation and a circular shift operation in a frequency domain on the set of symbols to generate a shifted set of symbols.

5. The method of claim 4, further comprising determining a power of the shifted set of symbols and averaging the power over time for each sub carrier index represented in the set of symbols to determine a respective normalized interference for each sub carrier index.

6. The method of claim 5, performing interference separation according to the respective normalized interference to determine the degree of frequency dispersion and to determine the degree of time dispersion.

7. The method of claim 1, further comprising:
generating an instruction to adjust a cycle prefix according to the degree of time dispersion; and
transmitting the instruction to a remote device.

8. A system comprising:
an antenna;
processing circuitry communicatively coupled to the antenna, the processing circuitry being configured to receive data formatted according to an orthogonal frequency division multiplexing protocol, the processing circuitry comprising:
circuitry that receives a test frame, the test frame comprising a set of symbols that are encoded in a predetermined subcarrier activation pattern, the predetermined subcarrier activation pattern being configured to maximize distance between active subcarriers to facilitate a detection of interference between pairs of adjacent symbols among the set of symbols;
circuitry that determines a degree of frequency dispersion expressed in the set of symbols; and
circuitry that determines a degree of time dispersion expressed in the set of symbols.

9. The system of claim 8, wherein the processing circuitry further comprises circuitry that determines a plurality of time averaged interference values, each time averaged interference value corresponding to a respective subcarrier index expressed in the set of symbols.

10. The system of claim 9, wherein the processing circuitry further comprises circuitry that determines a difference between a first portion of the plurality of time averaged interference values and a second portion of the plurality of time averaged interference values to determine the degree of frequency dispersion.

11. The system of claim 9, further comprising a display, the display being configured to render a graphical representation of the degree of frequency dispersion and the degree of time dispersion.

12. The system of claim 11, wherein the graphical representation comprises a frequency domain eye diagram.

13. The system of claim 8, wherein a cyclic prefix of subsequently received data is adjusted according to the degree of time dispersion.

14. A system comprising:
processing circuitry configured to:
receive a set of symbols encoded in a predetermined subcarrier activation pattern according to an orthogonal frequency division multiplexing protocol;
determine a plurality of time averaged interference values, each time averaged interference value corresponding to a respective subcarrier index expressed in the set of symbols; and
separate frequency-based interference from time-based interference according to the plurality of time averaged interference values.

15. The system of claim 14, wherein the predetermined subcarrier activation pattern specifies that each pair of activated subcarriers of consecutive symbols, among the set of symbols, is separated according to a maximum circular separation.

16. The system of claim 14, wherein the processing circuitry is further configured to determine a difference between a first portion of the plurality of time averaged interference values and a second portion of the plurality of time averaged interference values to determine the frequency-based interference.

17. The system of claim 14, wherein the processing circuitry is further configured to generate an instruction to adjust a cycle prefix according to the time-based interference.

18. The system of claim 14, wherein the processing circuitry is further configured to render for display a graphical representation of the plurality of time averaged interference values.

* * * * *